(12) United States Patent
Eves et al.

(10) Patent No.: US 8,176,115 B2
(45) Date of Patent: May 8, 2012

(54) REAL-WORLD REPRESENTATION SYSTEM AND LANGUAGE

(75) Inventors: David A. Eves, Crawley (GB); Richard S. Cole, Redhill (GB)

(73) Assignee: AMBX UK Limited, Surrey (GB)

( * ) Notice: Subject to any disclaimer, the term of this patent is extended or adjusted under 35 U.S.C. 154(b) by 1794 days.

(21) Appl. No.: 10/143,643

(22) Filed: May 10, 2002

(65) Prior Publication Data

US 2002/0169817 A1 Nov. 14, 2002

(30) Foreign Application Priority Data

May 11, 2001 (GB) .................................. 0111431.3

(51) Int. Cl.
*G06F 15/16* (2006.01)
*G06F 17/00* (2006.01)
(52) U.S. Cl. ...................................... 709/202; 715/234
(58) Field of Classification Search .......... 709/201–203, 709/231; 704/235; 715/786, 234; 725/91; 345/706
See application file for complete search history.

(56) References Cited

U.S. PATENT DOCUMENTS

| | | | | |
|---|---|---|---|---|
| 5,887,118 | A | 3/1999 | Huffman et al. | 392/390 |
| 6,038,573 | A * | 3/2000 | Parks | 715/202 |
| 6,430,526 | B1 | 8/2002 | Toll | 703/1 |
| 6,556,222 | B1 * | 4/2003 | Narayanaswami | 715/786 |
| 6,593,936 | B1 * | 7/2003 | Huang et al. | 345/619 |
| 6,611,297 | B1 * | 8/2003 | Akashi et al. | 348/739 |
| 6,741,242 | B1 * | 5/2004 | Itoh et al. | 345/419 |
| 6,892,230 | B1 * | 5/2005 | Gu et al. | 709/220 |
| 7,178,941 | B2 * | 2/2007 | Roberge et al. | 362/225 |
| 7,639,833 | B2 * | 12/2009 | LeComte et al. | 382/100 |
| 7,646,029 | B2 * | 1/2010 | Mueller et al. | 257/84 |
| 2001/0004739 | A1 * | 6/2001 | Sekiguchi et al. | 707/100 |
| 2002/0010734 | A1 * | 1/2002 | Ebersole et al. | 709/201 |
| 2002/0032564 | A1 * | 3/2002 | Ehsani et al. | 704/235 |
| 2002/0090985 | A1 * | 7/2002 | Tochner et al. | 463/1 |
| 2002/0116716 | A1 * | 8/2002 | Sideman | 725/91 |
| 2002/0129033 | A1 * | 9/2002 | Hoxie et al. | 707/101 |
| 2003/0076281 | A1 * | 4/2003 | Morgan et al. | 345/44 |
| 2003/0080989 | A1 * | 5/2003 | Matsuda et al. | 345/706 |

(Continued)

FOREIGN PATENT DOCUMENTS

BE 1011726 12/1999

(Continued)

OTHER PUBLICATIONS

Whitehouse K., VRML adds a new dimension to Web Browsing, Coputer Graphics and Applications, IEEE vol. 16, issue 4, Jul. 1996, pp. 7-9.*

(Continued)

*Primary Examiner* — George C Neurauter
(74) *Attorney, Agent, or Firm* — Burns & Levinson LLP; Bruce D. Jobse, Esq.

(57) ABSTRACT

A real-world representation system includes a set of devices, each device being arranged to provide one or more real-world parameters, for example, audio and visual characteristics. At least one of the devices is arranged to receive a real-world description in the form of an instruction set of a markup language and the devices are operated according to the description. General terms expressed in the language are interpreted by either a local server or a distributed browser to operate the devices to render the real-world experience to the user.

26 Claims, 4 Drawing Sheets

U.S. PATENT DOCUMENTS

2005/0275626 A1* 12/2005 Mueller et al. ............... 345/156

FOREIGN PATENT DOCUMENTS

| EP | 0508939 A2 | 3/1992 |
| --- | --- | --- |
| WO | WO9859282 | 6/1998 |
| WO | WO9921325 | 4/1999 |
| WO | WO 02092184 A1 * | 11/2002 |

OTHER PUBLICATIONS

Don Brutzman, "The Virtual Reality Modeling Language and Java", Jun. 1998.*

Augusto Celentano, "Virtual Worlds as Metaphors for Web Sites Exploration: Are they Effective?", Sep. 1999.*

Nasa's Instrument Ccontrol Markup Language (ICML). (Ames TJ: Sall KB; Warsaw CE) [Astronamical Society of the Pacific Conference Series, vol. 172, pp. 103-106, 1999] (abstract).

Integrated Home Service Network on Intelligent Intranet. (Sin Min Tsai; Shyi Shiou Wu; Shya Shiow Sun; Po Ching Yang) [2000 Digest of Technical Papers. International Conference on Consumer Electronics. Nineteenth in the Series (Cat. No. 00CH37102), pp. 104-105, Published: Piscataway, NJ, USA, 2000, 414 pp] (abstract).

* cited by examiner

REAL-WORLD REPRESENTATION SYSTEM AND LANGUAGE

BACKGROUND OF THE INVENTION

1. Field of the Invention

This invention relates to a method of controlling a set of devices, a real-world representation system, a markup language enabled device and a markup language.

2. Description of the Related Art

In order to make the Internet accessible to a larger number of people, HTML (HyperText Markup Language) was developed along with browsers that could read HTML files. HTML is a language that principally describes documents and links between documents. The browser reads the HTML code and displays the document comprised of the text and links on a PC screen. In order to extend the rather limited text only nature of HTML, JAVA was developed. JAVA is a programming language and a JAVA program (or applet as it is commonly referred to) is compiled from source to object code and is then addressed by an HTML link to produce graphics, etc., in the right place on the screen as desired. I.e., an HTML document can include within it a link to a compiled JAVA applet. In due course, to further extend the information that can be transferred by the Internet, VRML was developed. VRML originally stood for Virtual Reality Markup Language, but the M is now more often referred to as standing for Modelling. VRML is a way of describing a three-dimensional place or object in terms of its geometry that can then be represented on a screen that is user navigable.

However, none of these languages can even begin to describe a real-world experience nor render it for the end user.

SUMMARY OF THE INVENTION

According to a first aspect of the present invention, there is provided a method of operating a set of devices comprising receiving a real-world description in the form of an instruction set of a markup language, and operating said devices according to said description.

The method advantageously further comprises distributing the description among the devices or reading the description at a local server. The description may form part of a broadcast signal and/or it may relate to an activity that a user is undertaking.

According to a second aspect of the present invention, there is provided a real-world representation system comprising a set of devices, each device arranged to provide one or more real-world parameters, at least one of said devices arranged to receive a real-world description in the form of an instruction set of a markup language, and said devices being operated according to said description.

Owing to these two aspects of the invention, it is possible to provide and render a real-world experience.

Preferably, the devices are interconnected by a wireless network or by a power-line carrier network.

According to a third aspect of the present invention, there is provided a markup-language-enabled device comprising receiving means for receiving a real-world description in the form of an instruction set of a markup language, and adjusting means for adjusting one or more characteristics of the device according to said description.

Owing to this aspect of the invention, it is possible to provide a device that can be utilized in a system for providing a real-world experience.

Advantageously, the receiving means of the device includes part of a distributed browser stored on a record carrier, this part of the distributed browser interpreting the instruction set and communicating with the adjusting means. The browser can be arranged to interpret descriptions of a general type to generate specific parameter instructions for communicating to the adjusting means.

According to a fourth aspect of the present invention, there is provided a markup language for describing real-world experiences, comprising an instruction set including instructions interpretable by a markup enabled device to operate said device.

Owing to this aspect of the invention, it possible to create instruction sets that correspond to real-world experiences, within the confines of a markup language, that can be used by enabled devices to render these experiences. Such real-world experiences include visual, audio, olfactory and tactile sensations.

The markup language describes experiences in the physical world. It allows the authoring of spatial, temporal and structural elements and additionally, more ambient qualities, such as mood, sensory factors and the dynamics of the space.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

Figure 1:
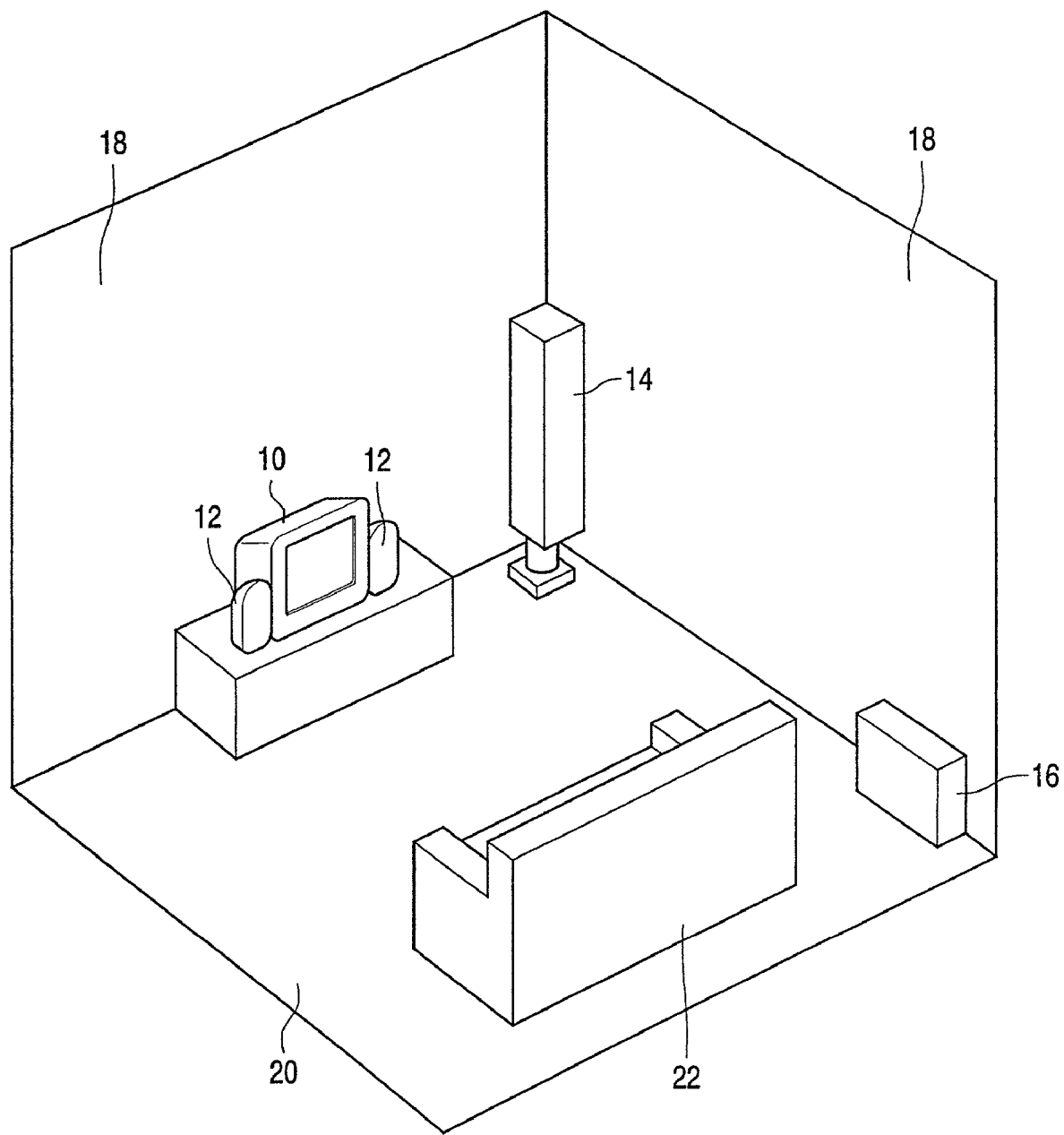
FIG. 1 is a schematic perspective view of a real-world representation system.

In FIG. 1, the real-world representation system comprises a set of devices including a display device 10, audio speakers 12, a lighting device 14, a heating device 16, walls 18 and the floor 20. These devices together contribute to make up the ambient environment, each device being arranged to provide one or more real-world parameters. For example, the lighting device 14 contributes color tones as well as to the luminance level. The devices may be electronic or they may be purely mechanical. The devices are interconnected by either a wireless network or a wired network, such as a power-line carrier network, or a conventional cable system, such as RS232 leads.

In addition to the display device 10, the walls 18 and floor 20 may be provided with display functionality. This can be achieved either by the walls 18 and floor 20 being composed of fabric display material, or a centered ceiling projector (not shown) can illuminate the visible portions of the walls 18 and the floor 20. It is also feasible to back light the walls 18 if the environment allows it.

The system of FIG. 1 is shown as being a room with a couch 22 for a user, the room being part of a private dwelling. However, the room could be, for example, a hotel room or part of an entertainment complex, or could form part of a public space.

At least one of the devices making up the real-world representation system is arranged to receive a real-world description in the form of an instruction set of a markup language, the devices being operated according to said description. This description could form part of a broadcast signal, or it could be recalled from a local or remote store. The description could relate to an activity that a user is undertaking, or it could be triggered from a user interface, or it could be trigger automatically from some predefined event, for example, a user entering a room.

Figure 2:
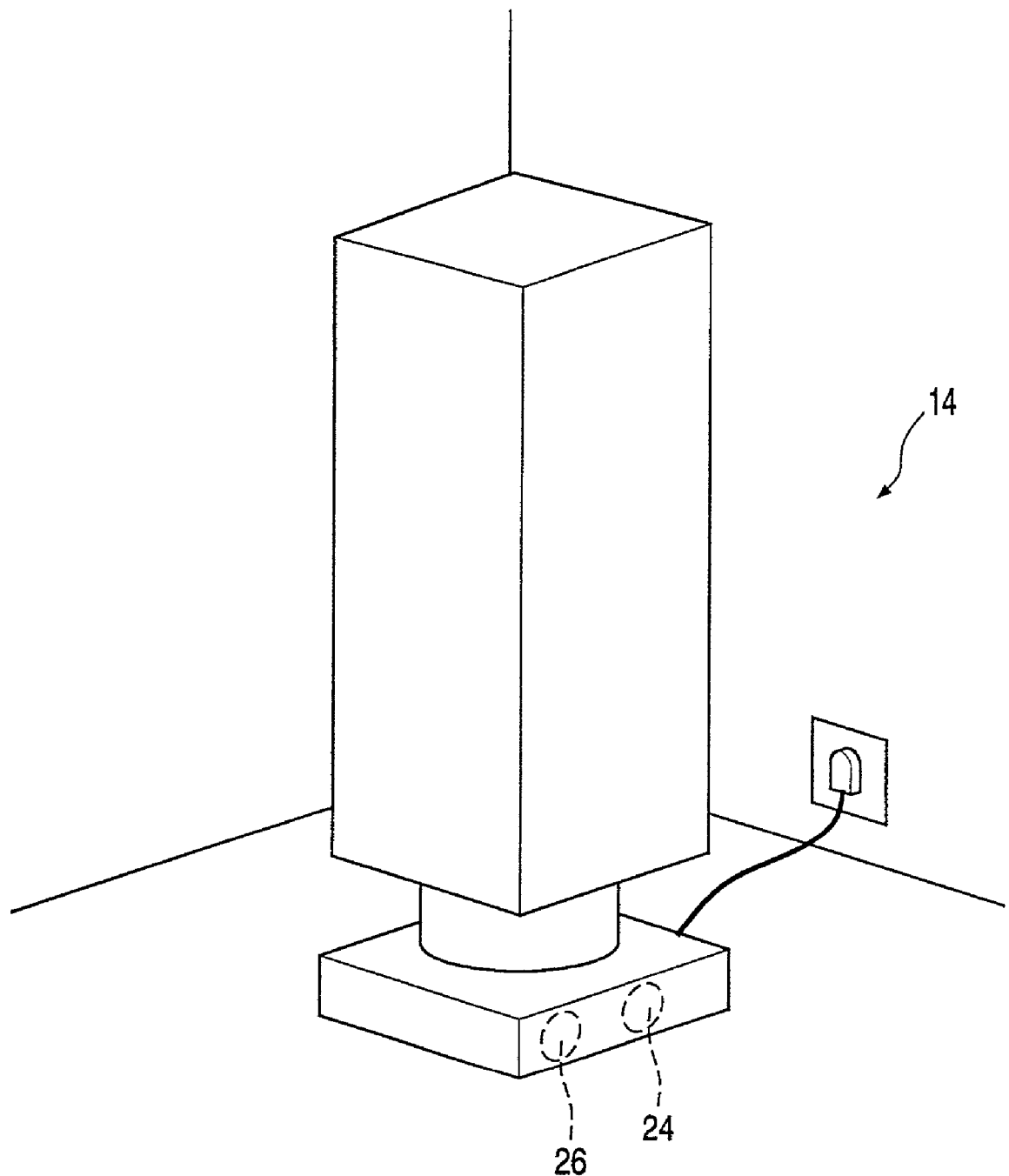
FIG. 2 is a perspective view of a markup language enabled device of the system of FIG. 1.
Figure 3:
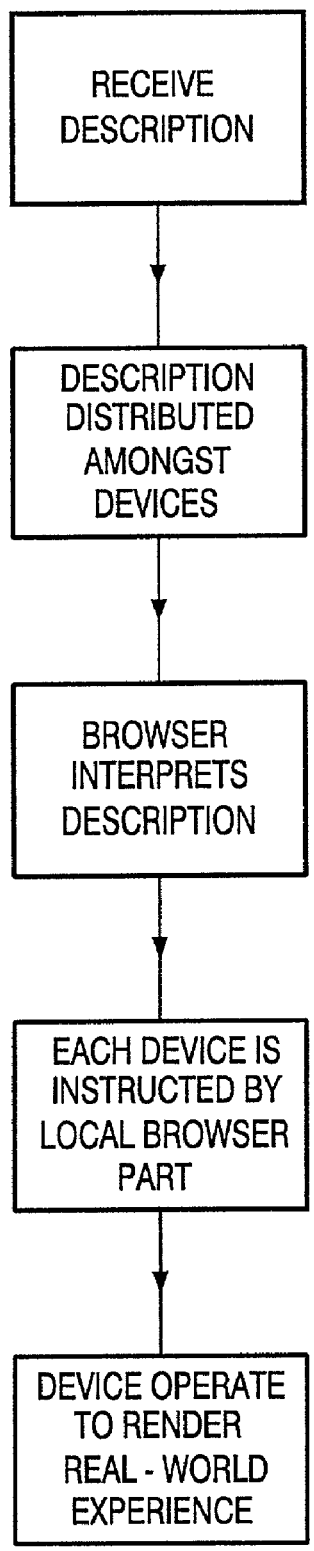
FIG. 3 is a flowchart of a method of controlling a set of devices.

In a first embodiment (outlined in the flowchart of FIG. 3), this description is distributed among the devices. Each markup-language-enabled device operates, principally, the same manner. For example, the lighting device 14 (shown in more detail in FIG. 2) has receiving means 24 for receiving the real-world description in the form of an instruction set of a markup language, the receiving means 24 including part of a distributed browser that interprets the instructions of the instruction set. The portion of the browser in the receiving means 24 communicates with adjusting means 26 that is arranged to adjust one or more parameters of the lighting device 14. For example, if the real-world description reads <FOREST>, <SUMMER>, <EVENING>, then the browser part in the receiving means 24 interprets this into specific instructions relating to the color tones and luminance level for the adjusting means 26 to adjust their levels accordingly. In this example, the likely color tone would be a pleasant green and the light level would be low but warm. The browser part interprets instructions of a general type to generate specific parameter adjustments.

The description is received by all of the other parts of the distributed browser in each of the other devices in the real-world representation system. Each device interprets the instructions and adjusts its parameter configuration accordingly. The more enabled devices that are present in a particular environment, the more realistic the end result will be. In particular, the operability of the walls 18 and floor 20 as display devices will determine how immersed in the real-world representation the user feels.

Figure 4:
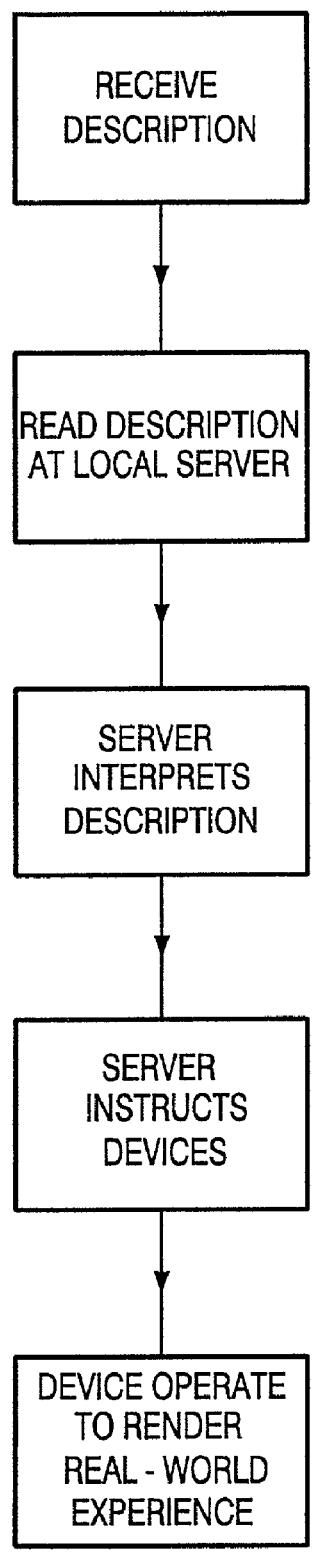
FIG. 4 is a flowchart of an alternative method of controlling a set of devices.

In a second embodiment (outlined in the flowchart of FIG. 4), the description is read at a local server, which can be a dedicated device or could be contained within the capability of a device that nominally has a different purpose. In this embodiment, a browser or operating system present on the local server interprets the instructions of the real-world description and generates specific parameter adjustments for communicating to the relevant device. In this way, devices currently available can be used without the requirement that they be modified or purposefully built for use in the real-world representation system.

In addition to the devices shown in FIG. 1, a wide variety of additional devices are possible to augment the user's experience. These include such things as robotic devices, such as robot lamps, interactive art, such as pictures and sculpture, animatronic furniture and animatronic electronic equipment. All of these can contribute to the user's experience according to their functionality.

The inclusion of the description in a broadcast signal allows the user to be immersed in an environment that is linked to a broadcast that he/she is receiving, for example, a broadcast television signal. I.e., if the user is watching a film, then, as the film moves through various scenes, in turn, these scenes can be rendered by the set of devices making up the real-world representation system. If an underwater scene is showing on the television, then the broadcast could include a description <WATER>, <COLD> and this will be interpreted by the relevant parts of the system to render the real-world experience to the user, e.g., by turning the lights blue, etc. The description need not be itself included in the broadcast signal, for example, a URL may be embedded in the signal and the description is communicated via a web link using the URL.

The description can be received at all locations where there is a real-world representation system operating, and each individual system will render the experience to the best of the functionality of the devices in the system. For example, a cinema may be designed so that it can render experiences through devices other than the conventional display screen and audio system. This will allow films that are augmented with descriptions to provide additional immersion into the film for viewers at the cinema.

The description can also relate directly to an activity that a user is undertaking, for example, reading a book. The individual pages of the book can trigger different descriptions being passed to the real-world representation system. Each description is linked by content to the particular theme or scene of the book at the respective point in the book. For example, the children's story "Little Red Riding Hood" has a number of discrete scenes within it, including a forest and the interior of a cottage, each of which can be rendered by the devices of the system, in turn, depending upon the place in the story that the reader has reached. A movement sensor may be employed to detect the turning of the pages, or the book may have built-in functionality that automatically detects which page the reader is looking at and triggers the appropriate description that is then rendered by the system. The triggering is ideally carried out via a wireless connection.

The description may also be delivered to a user in a manner other than via a broadcast signal. For example, the description may be triggered from a physical carrier, such as a postcard which is augmented to include a description (or a URL pointing to a description) in the form of an instruction set of the markup language. This description could relate to the view depicted on the postcard. The description could be stored on the postcard in the form of a barcode, embedded RF tag or other similar technology. When the user receives the postcard, their real-world representation system is transformed to reflect the scene or experience on the postcard. A tag reader coil can be placed around the letterbox, so that when the postcard arrives, the system in the user's house reacts according to the description embedded in the postcard. The description on the postcard need not relate to the postcard, but could equally relate to the sender of the postcard.

Other methods of delivering the description to a user are possible. Local IR and RF systems can be utilized as carriers for descriptions. In the case of IR, this would be a standard or high-end remote control that an individual uses to control his/her consumer electronic devices around the home. The remote control is provided with, or has the ability to upload, descriptions or fragments of the markup language.

A user can therefore operate the system in a relatively simple manner from a user interface, such as a remote control, although equally an enabled PDA or other mobile terminal could be employed. The user can select an environment that he/she wishes to be immersed in from pre-selected total descriptions or create a new environment from pre- or user-defined variables. Such a total description may, for example, be <CHINESE RESTAURANT>, this real-world experience then being rendered by the devices in the system. The real-worlds generated can be fantasy environments or they can be realistic.

RF systems, such as Bluetooth, are also suitable for transmitting and receiving descriptions. In this way, descriptions can migrate by being stored on devices with Bluetooth capability. Such devices would be PDAs, mobile phones, lap-top computers etc. As these devices are carried by users from environment to environment, there exists the ability to pass descriptions between the mobile device and a local storage medium. In this way, new descriptions are received by environments.

The Internet is also a route by which descriptions may be delivered to a user or directly to an environment. As the description is provided in a markup language format, descriptions and fragments of descriptions can easily be stored on servers for recall via a PC or suitably enabled digital TV. The descriptions can be updated and amended by the authors, thereby allowing a large and varied library of descriptions to be created, all of which can be easily accessed by a user.

A user can also generate instruction sets to augment experiences, such as films. In effect, the user authors descriptions that can be added to the original content. In this way, the user's enjoyment of the film is increased. The user adds a data track to a recordable format disc, for example, CD+RW or DVD+RW, via a PC to create a set of effects to go with the various scenes of the story. When the film is played back in an enabled environment, an enhanced experience of the film is provided. In addition to authoring his/her own description, a user can recall descriptions from a library of instruction sets, which may be provided, for example, via the Internet.

The user can also operate the user interface to set limits on the operation of the devices in the system. For example, if the user wishes to set the volume of those devices with an audio capability to a specific range, or set an upper limit on the volume, then the user can do so via the user interface. This prevents experiences becoming unpleasant for the user. The level of the light and the rate of any change in light intensity are also things that the user can control. All of the parameters of the system can be user defined.

In addition to the examples described above, which can be characterized as generally involving a "passive" user, interactive applications of the system are possible. An example of this is a game that a user may play, via a PC or games console, for example. If the game is augmented with a description relating to the scenario and/or locations of the game world, then as the user navigates the game world, the environment around the user changes accordingly.

The description of the real-world experiences is provided by a markup language that communicates a description of physical environments and the objects within them, their relationship to the user, each other and to the physical space. Within a location that is enabled to produce a real-world experience, the instruction set of the markup language is interpreted by a device or devices to render the experience. Each device that is enabled contains a component that interprets the instruction set to the best of its capability.

The language contains a wide range of states that can be rendered by the devices in a real-world representation system. Such states relate to:—

Image display—specific images, streamed video
Audio—music, sound effects, voice
Mood—emotional, ambient, animated
Light—levels (relative/absolute), moods, colors, position, focus
User display and input—feedback, menu display
Time—time of day, season
Location—absolute, fantasy, generic type.
Smell—background, responsive
Motion—robot devices
Animatronic—movable furniture The language has the ability to be extended to cover other states and forms of representation as desired.

Any information that relates to a physical experience can be expressed in this markup language. To create instruction sets in the markup language, an author can write directly into the language, or a computer program for authoring an instruction set can be used. The authoring program can take data input in the form of, for example, text or video, and can generate a set of instructions comprising a subset of the markup language that, when passed to a real-world representation system, will allow the devices in that system to render the experience that corresponds to that of the text or video.

The language is XML compliant, XML being a meta-language that describes the standard structure for new markup languages.

The invention claimed is:

1. A method of operating a set of real devices in a real environment, each real device being arranged to provide one or more parameters to generate an ambient environment, comprising:
   generating a real-world description in the form of an instruction set of a markup language;
   automatically applying said real-world description to at least one of said real devices;
   automatically adjusting one or more parameters of said real device according to the instruction set; and
   operating said real devices according to said real-world description to generate the ambient environment.

2. The method as claimed in claim 1, wherein said method further comprises:
   distributing said real-world description among said real devices.

3. The method as claimed in claim 1, wherein said generating step comprises:
   reading said real-world description at a local server.

4. The method as claimed in claim 1, wherein said generating step comprises:
   receiving said real-world description, said real-world description forming part of a broadcast signal.

5. The method as claimed in claim 1, wherein said real-world description relates to an activity that a user is undertaking.

6. The method as claimed in claim 1, wherein said real-world description is triggered from a user interface.

7. The method as claimed in claim 6, wherein said triggering is carried out via a wireless connection.

8. The method as claimed in claim 1, wherein said real-world description is triggered from a physical carrier.

9. A real-world representation system comprising:
   a generated real-world description in the form of an instruction set of a markup language;
   a set of real devices in a real environment, said real devices providing one or more real-world parameters to generate an ambient environment,
   at least one of said real devices arranged to receive the real-world description in the form of an instruction set of a markup language and for automatically adjusting one or more parameters of said real device according to the instruction set, and
   said at least one real device being operated according to said real-world description to generate the ambient environment.

10. The real-world representation system as claimed in claim 9, wherein said real-world representation system comprises a wireless network for interconnecting said real devices.

11. The real-world representation system as claimed in claim 9, wherein said real-world representation system further comprises a powerline carrier network for interconnecting said real devices.

12. The real-world representation system as claimed in claim 9, wherein at least one of said real devices comprises a local server.

13. The real-world representation system as claimed in claim 9, wherein said real-world description is distributed among said real devices.

14. The real-world representation system as claimed in claim 9, wherein at least one of said real devices comprises a user interface.

15. A markup-language-enabled real device being arranged to provide one or more parameters to generate an ambient environment, comprising:
a generated real-world description in the form of an instruction set of a markup language;
receiving means for receiving the real-world description in the form of an instruction set of a markup language; and
adjusting means for automatically adjusting one or more parameters of the real device according to said description to generate the ambient environment.

16. The markup-language-enabled real device as claimed in claim 15, wherein said markup-language-enabled real device is an electronic device.

17. The markup-language-enabled real device as claimed in claim 15, wherein said markup-language-enabled real device is a display device.

18. The markup-language-enabled real device as claimed in claim 15, wherein said markup-language-enabled real device has audio capabilities.

19. The markup-language-enabled real device as claimed in claim 15, wherein said markup-language-enabled real device is a lighting device.

20. The markup-language-enabled real device as claimed in claim 15, wherein said markup-language-enabled real device is a heating device.

21. The markup-language-enabled real device as claimed in claim 15, wherein said receiving means includes part of a distributed browser stored on a record carrier, said part of the distributed browser interpreting said instruction set and communicating with said adjusting means.

22. The markup-language-enabled real device as claimed in claim 21, wherein said part of said browser is arranged to interpret instructions of a general type to generate specific parameter adjustments for communicating to said adjusting means.

23. A real-world representation system comprising:
A) a generated real-world description in the form of an instruction set of a markup language;
B) a plurality of real devices having one or more real-world parameters and capable of generating an ambient environment;
C) a server, operably coupled to the plurality of real devices, and configured for:
i) interpreting a received real-world description;
ii) generating specific parameter adjustments in accordance with an interpretation of a received real-world description; and
iii) communicating the specific parameter adjustments to at least one of the plurality of real devices.

24. The real-world representation system of claim 23 further comprising:
D) a source of the real-world description.

25. The real-world representation system of claim 24 wherein the real-world description comprises an instruction set of a markup language and wherein the real-world parameters of the plurality of real devices are markup-language-enabled.

26. A method of operating a real device capable of generating an ambient environment and having at least one adjustable parameter associated therewith, the method comprising:
generating a real-world description in the form of an instruction set of a markup language;
receiving with the real device a real-world description in the form of markup language instructions;
interpreting with the real device the instructions and generating device specific parameter adjustments therefrom;
modifying with the real device the at least one parameter according to the specific parameter adjustments; and
generating with the real device an ambient environment according to the modified parameter.

* * * * *